United States Patent [19]

Leonard et al.

[11] Patent Number: 4,458,708

[45] Date of Patent: Jul. 10, 1984

[54] FLUID DISTRIBUTION SYSTEM

[75] Inventors: James L. Leonard, 8631 E. Roanoke, Scottsdale, Ariz. 85257; James D. Butts, Tempe, Ariz.

[73] Assignee: James L. Leonard, Scottsdale, Ariz.

[21] Appl. No.: 448,683

[22] Filed: Dec. 10, 1982

[51] Int. Cl.³ .............................................. F16K 11/02
[52] U.S. Cl. .................................. 137/9; 137/624.14; 137/625.11; 137/119
[58] Field of Search .............. 137/119, 624.14, 624.18, 137/625.11, 625.15, 625.16, 9; 239/66, 563, 564

[56] References Cited

U.S. PATENT DOCUMENTS

| | | | |
|---|---|---|---|
| 2,081,510 | 5/1937 | Smart | 137/624.14 |
| 2,642,076 | 6/1953 | Tigert et al. | 137/119 |
| 3,319,655 | 5/1967 | Palmer | 137/624.18 |
| 4,077,424 | 3/1978 | Ehret et al. | 137/624.14 |

Primary Examiner—Martin P. Schwadron
Assistant Examiner—James R. Shay
Attorney, Agent, or Firm—Cahill, Sutton & Thomas

[57] ABSTRACT

A water distribution apparatus employs a self-positioning water flow actuated rotor for serially channeling water flow into each of a plurality of outlet conduits from a common source of water under pressure. The rotor, housed within an encapsulating cavity, includes a hollow hub closed at an end and having the other end in fluid communication with the source of water under pressure. A plurality of jets eject water from within the hub intermediate a pair of hub mounted discs and provide motive power for rotating the rotor. Opposed apertures in the discs provide fluid communication between the jets and serially with a selected pair of opposed outlets connected with one of the outlet conduits; the rotational positioning of the rotor corresponding with a pair of outlets is regulated by a timed solenoid. Axial centering of the rotor within the cavity intermediate the opposed pairs of outlets is provided by the water pressure acting on the closed end of the hub in conjunction with bearing members defining the limits of the hub's axial movement.

36 Claims, 4 Drawing Figures

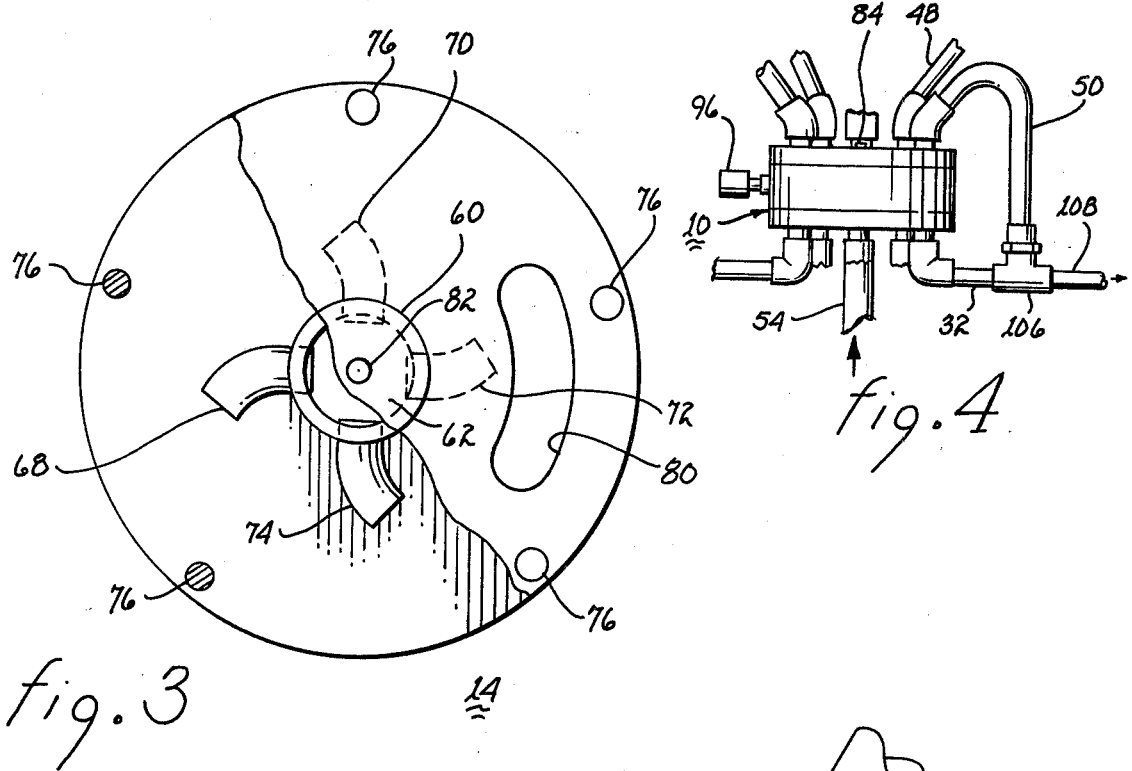
fig.3
fig.4
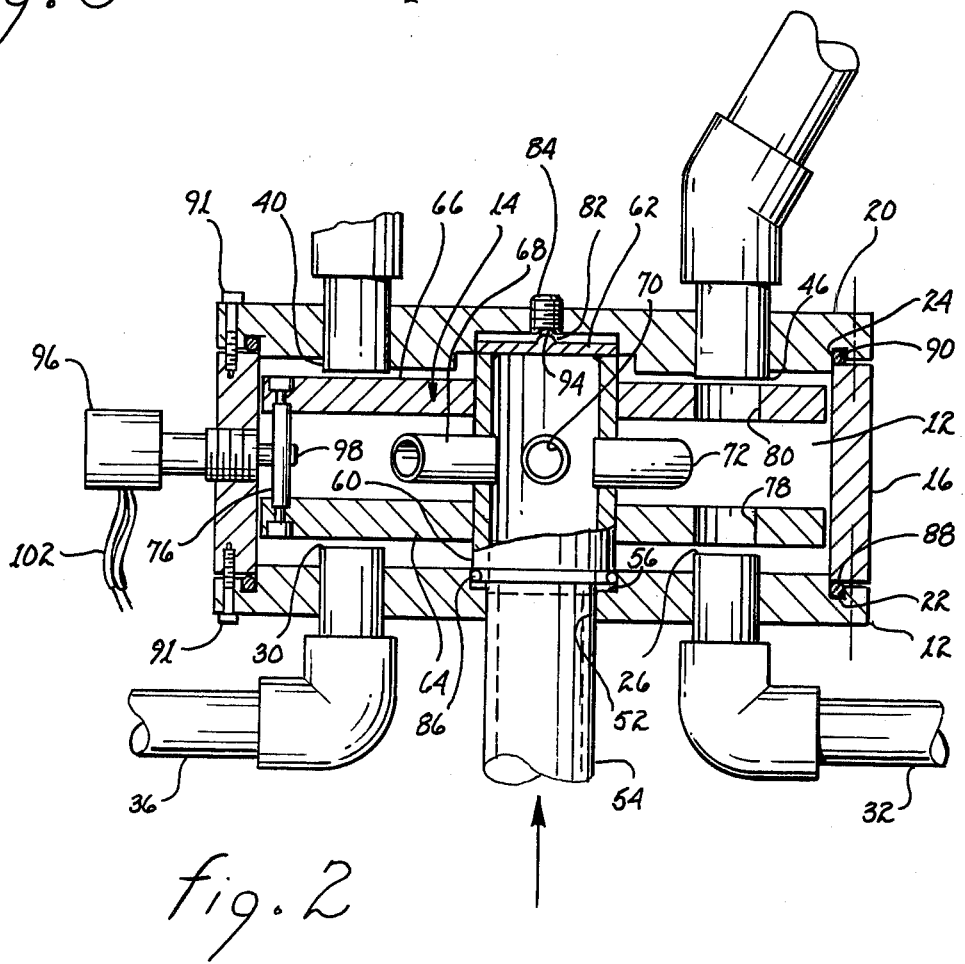
fig.2

FLUID DISTRIBUTION SYSTEM

The present invention relates to water distribution systems and, more particularly, to apparatus for distributing water from an inlet conduit serially into a selected one of a number of outlet conduits.

Modern recently built swimming pools employ water turbulating devices for periodically urging a flow of water across a selected part of the pool bottom or side surfaces. The turbulated water tends to place in suspension dirt and debris accumulated on the respective pool surfaces. The suspended matter is ultimately drawn into the pool drain wherefrom it is pumped through a filter and the filtered water is returned to the pool. For best results, a flow of water is periodically channeled to each turbulating device.

Various machines have been developed for periodically channeling water from a source of water under pressure to each of the turbulating devices. One type of such machine includes an impeller driven by inflowing water, which impeller drives a gear train actuated valve mechanism. Various configurations of machines of this type are described in U.S. Pat. Nos. 2,081,510, 3,108,609, 3,181,551, 3,509,998, 4,077,424 and 4,313,455. Herein, an actuating element energized by the gear train periodically opens the valve mechanism to permit water outflow through one of a plurality of outlet conduits. Each outlet conduit is connected to one or more turbulating devices. Such a machine is relatively maintenance free if made of plastic or like man-made material. However, the number of continuously moving parts is substantial which creates wear problems. Moreover, the number of moving parts, in combination with the force necessary to actuate serially the valve mechanism, places certain minimum constraints upon either the water flow rate or the water pressure. Since the duration of valve opening and the length of the cycle is set by the gear train, adjustment of the duration is only available through variation in water flow or by change in gear ratios.

Another type of machine useable for this purpose includes an axially translatable reciprocating element for actuating a flow control function to serially direct the flow of water from an inlet into one of a plurality of outlets. Various configurations of machines of this type are described in U.S. Pat. Nos. 3,369,204, 3,642,022, 4,316,480 and Re. 29,252. Herein, an ancillary mechanical or electrical valve periodically biases a water flow from the inlet to establish a force acting upon the translatable element to effect translation thereof. Translation of the element interconnects the inflowing water with one of the outlets; upon initial or reciprocating motion of the translating element a valving function is performed to interconnect the next serially oriented outlet with the water inlet.

In U.S. Pat. No. 3,319,655 there is described a valve having a cylindrical cavity with a rotationally positionable rotor mounted therein. The rotor includes a passageway extending therethrough for serial interconnection with one of a plurality of outlets disposed in one side of an end wall forming the cavity. The other end wall forming the cavity includes an inlet and is spaced from the rotor to form a space therebetween for water flow from the inlet to the rotor passageway. External cam means periodically actuates a motor for rotating the rotor and permitting water flow into the inlet; the configuration of the lobes of the cam means ensures a limited rotation of the rotor sufficient only to align the passageway with the next outlet and a cessation of water flow during rotation of the rotor to prevent jamming.

Other United States patents directed to various flow path regulating machines include Nos. 2,327,046, 2,524,234, 2,742,918 and 2,884,006.

The water distribution apparatus described herein includes a cylindrical cavity having a plurality of circularly located outlet apertures disposed at one end thereof and a corresponding number of axially aligned paired outlet apertures disposed at the other end thereof. A centrally located inlet aperture is disposed in one end of the cylindrical cavity. A rotor having a pair of axially spaced apart discs mounted upon an hollow hub is rotatably mounted within the cavity intermediate the opposed paired outlets. Water from the inlet flows into the hub and is discharged through a plurality of jets disposed intermediate the discs; the water discharge from the jets creates a bias force for rotating the rotor. Each of the discs includes an elongated aperture, which apertures are aligned with one another and juxtapositionable with each paired outlet apertures to provide fluid communication between the cavity and the juxtaposed pair of opposed outlet apertures on a selective basis dependent upon the rotational position of the rotor. A selectively actuatable solenoid restrains rotation of the rotor to incremental movements corresponding with the spacing between arcuately separated pairs of outlet apertures to direct serially water flow to each pair of outlet apertures. Use of the apparatus may be in conjunction with pool cleaning systems, as contemplated herein, but may equally well be used in other fluid distribution environments.

It is therefore a primary object of the present invention to provide a water distribution apparatus having a single rotating element for serially distributing water to each of a plurality of outlets.

Another object of the present invention is to provide a water distribution apparatus having a wide range of useable water pressures and flow rates.

Yet another object of the present invention is to provide a water distribution apparatus which balances the pressures attendant opposed surfaces of a rotor subjected to different pressures imposed by an inlet, an open outlet and several closed outlets.

Still another object of the present invention is to provide a water distribution apparatus which self regulates the clearance attendant inflow, outflow and nonflow valving functions.

A further object of the present invention is to provide a water distribution apparatus which eliminates the danger of destructive pressure waves attendant rapid water flow shutoff.

A yet further object of the present invention is to provide an inexpensive water distribution apparatus.

A still further object of the present invention is to provide a method for directing a flow of water from a source of water to a serially selected one of a plurality of outlet conduits through operation of a single rotating element.

A still further object of the present invention is to provide a method for balancing the pressures attendant opposed surfaces of a rotor subjected to different pressures imposed by an inlet, an open outlet and several closed outlets of a water distribution apparatus and permit rotation of the rotor in response to low pressure and low flow rates.

These and other objects of the present invention will become apparent to those skilled in the art as the description of the invention proceeds.

The present invention may be described with greater specificity and clarity with reference to the following figures, in which:

FIG. 2 is a partial cross-sectional view to illustrate the relationship between the fixed and moveable elements;

FIG. 3 is a top view taken along lines 3—3, as shown in FIG. 1; and

FIG. 4 illustrates the interconnection between the outlet apertures and the outlet conduits.

Figure 1:
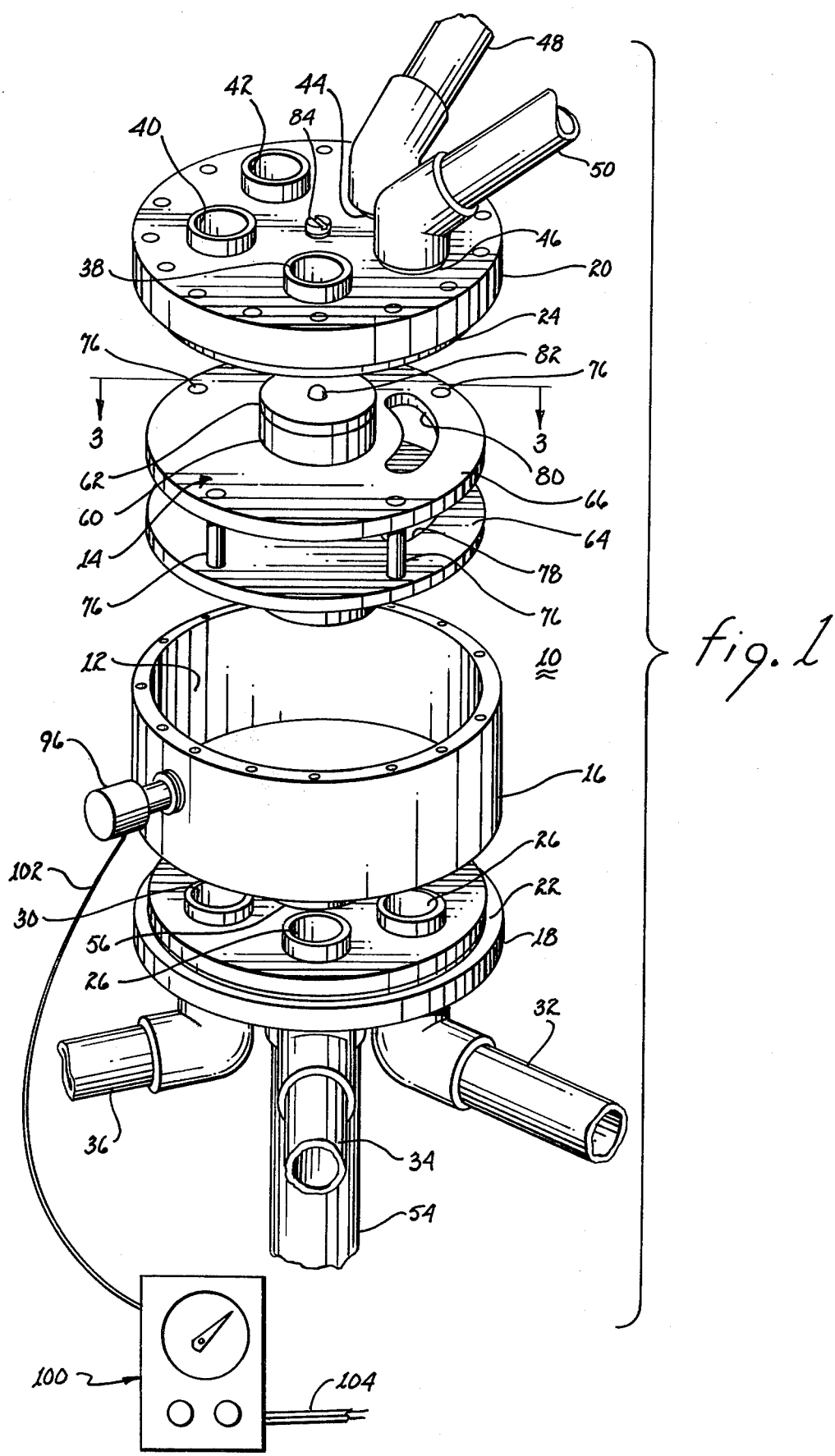
FIG. 1 is an isometric view of the water distribution apparatus and showing the major components thereof.

Referring to FIG. 1, there are shown the major components of water distribution apparatus 10. A cylindrical cavity 12 for housing rotor 14 is formed by a cylindrical section 16 capped on either end of plates 18, 20. Plate 18 may include an indentation 22 disposed about its perimeter for effecting a good mechanical junction and seal with the corresponding edge or side of cylindrical section 16. A similar indentation 24 for the same purposes may be disposed in plate 20.

A plurality of outlet apertures, such as five in the embodiment to be described and three of which are shown, 26, 28 and 30, may be disposed in plate 18. Each of these outlet apertures is connected to an outlet conduit, such as outlet conduits 32, 34 and 35. Plate 20 also includes outlet apertures, of which all five are shown, 38, 40, 42, 44 and 46. Outlet conduits 48 and 50, extending from outlet apertures 44, 46, respectively, are shown; the outlet conduits associated with outlet apertures 38, 40 and 42 are deleted for purposes of clarity of illustration. As may be deduced from FIG. 1, each outlet aperture in plate 18 is in axial alignment with one of the outlet apertures in plate 20. The outlet conduits attendant axially aligned ones of the outlet apertures are interconnected through a Y or T connector to direct flow into a single conduit (see FIG. 4). An inlet aperture 52 is disposed in plate 18 for receiving and sealingly engaging inlet conduit 54.

Referring to FIGS. 1 and 3, the structural features of rotor 14 will be described in detail. The rotor includes an hollow hub 60 having a cover 62 disposed across the upper end thereof. The hub supports a pair of discs 64, 66. A plurality of water exhausting jets 68, 70, 72 and 74 are mounted in hub 60 intermediate the discs for exhausting water from within the hub. As may be noted from FIG. 3, the exhausted water will have a non-radially aligned component of thrust and thereby provide a rotational force acting upon the rotor to cause the rotor to rotate. A plurality of studs 76 are disposed in proximity to the perimeter of the discs. These studs provide structural rigidity to the discs and also serve a timing function, as will be explained in detail below.

Each disc 64, 66 includes an elongated aperture 78, 80, respectively, which apertures are vertically superimposed on one another. The center line of each elongated aperture has a radius equivalent to that of the radius defined by the center of the outlet apertures in plates 18 and 20. The width of the elongated aperture is commensurate with the diameter of the outlet apertures and the ends of the elongated apertures define semi-circles. The angle subtended by the elongated apertures may be equivalent to the angular displacement between adjacent outlet apertures.

It is to be understood that two or more elongated apertures may be disposed in the discs to achieve flow into more than one pair of opposed apertures; or, the elongated apertures may extend to three or more pairs of opposed apertures to achieve flow into more than one pair of opposed apertures.

A pin 82 extends upwardly from the center of cover 62. This pin rests within and is axially aligned with a divot disposed within the bottom end of threaded member 84, which member is threadedly engaged with plate 20 at its center.

Referring to FIG. 2, further structural details attendant the interconnection between the housing and the rotor will be described. The lower end of hub 60 includes a bearing 86 for supporting the hub within an annular expanded section 56 in axial alignment with aperture 52. Bearing 86 and section 56 are configured to permit at least a limited degree of axial movement of the hub with respect to plate 18. The upper end of hub 60 is positionable within a circular recess 92, which recess is intended to accommodate axial movement of the hub. The upper limit of axial movement of the hub is restrained by axial positioning of threaded member 84 whereby vertical movement of divot 94 is regulatable. The sealing of threaded member 84 within plate 20 is well known to those skilled in the art.

The junction between plate 18 and cylindrical section 16 may be sealed by deployment of an O-ring 88 in indentation 22. A similar seal may be effected between plate 20 and the cylindrical section by use of an O-ring 90 in indentation 24. Attachment of the plates to the cylindrical section may be by means such as screws, threaded bolts 91 or the like.

A solenoid 96 is mounted within cylindrical section 16 to permit plunger 98 thereof to extend into cavity 12 sufficient to engage studs 76. On actuation of solenoid 96, plunger 98 is retracted, which retraction permits free rotation of rotor 14. By selecting a solenoid having a magnetic plunger, the plunger may be disposed within a cylindrical recess of the solenoid, which recess is in fluid communication only with cavity 12. A timing circuit 100 electrically energizing the solenoid through leads 102 may be used in conjunction with the solenoid to obtained timed incremental movement of the rotor. Electrical power to the timing circuit is supplied through electrical leads 104.

From the above description of the housing it will become apparent that none of the elements of the water distribution apparatus moveably extends through a wall or other elements, except for threaded member 84. Hence, all problems attendant sealing of moving elements are totally avoided as the sealing of threaded members is well developed in the relevant art.

In operation, the pressure attendant the water flowing into hub 60 through inlet conduit 54 will act against the inside surface of cover 62 to establish an outwardly directed force upon the rotor. In response to this force, the rotor will be raised. The extent to which the rotor is raised is regulated by threaded member 84, of which divot 94 serves as a bearing surface for pin 82. Preferably, the upper limit to which rotor 14 is raised is a position wherein the corresponding surfaces of discs 64 and 66 are equidistant from their respective outlet apertures in plates 18, 20.

That is, a certain amount of clearance is purposely established between the outlet apertures and the corresponding disc surface. By experimentation, it has been found that a clearance of ten thousandth of an inch is easily achievable and provides excellent results. Such clearance provides some water leakage into the closed outlets but the flow rates thereof have an essentially inconsequential effect.

Without clearance between the surfaces of the discs and the corresponding outlet apertures, the pressure differential between the pressure intermediate the discs and the substantially reduced pressure attendant the closed outlet apertures would create a substantial friction force between the contacting surfaces and prevent operation of the rotor as intended. By interconnecting opposed outlet apertures (see FIG. 4), any pressure differences which might be caused by differences in clearance between opposed outlet apertures and the discs are equalized and no loads are imposed on the rotor because of clearance differences.

It is appreciated that at rest, rotor 14, in the absence of pressure within hub 60, will rest upon the surfaces defining the outlet apertures in plate 18. However, as soon as water flow into the hub begins, the rotor will be raised into a non-contacting relationship with the outlet apertures attendant plate 18 and damage to either the rotor or the outlet apertures due to contact therebetween commensurate with rotation of the rotor is avoided.

The force of water ejected through jets 68, 70, and 74 will cause the rotor to rotate counterclockwise. Rotation is periodically restrained through extension of plunger 98 from solenoid 96. Upon extension of the plunger, it will interferingly engage with one of studs 76. The positional relationship of the studs with respect to the rotor is such that one end of apertures 78 and 80 within discs 64, 66, respectively, will be coincident with one of the opposed pairs of outlet apertures. Therefore, water will flow from in between the discs through apertures 78, 80 into the corresponding outlet apertures and into the conduits extending from the apertures. It may be noted that the flow in opposed directions will be essentially equal since the conduits are interconnected through a T and the pressures in the opposed conduits will be essentially equalized. Thus, no imbalance of forces acting on the rotor is created upon flow of water. Accordingly, no forces are created by the outlet flows which would tend to bias the rotor upwardly, downwardly or rotationally within a radial plane of the rotor.

On actuation of solenoid 96, plunger 98 will be momentarily retracted. Upon such retraction, the constantly existing rotational force upon the rotor created by discharge through jets 68, 70, 72 and 74 will cause the rotor to begin rotation as soon as the restraint is removed. Subsequent extension of plunger 98 will result in engagement of the peripherally next one of studs 76 and upon such engagement further rotation of the rotor will cease. Commensurate with rotation of the rotor, communication between the previously aligned opposed outlet apertures and cavity 12 becomes terminated due to passage of elongated apertures 78, 80 therepast. However, since elongated apertures 78 and 80 subtend an angle approximately equivalent to that between circumferentially aligned opposed outlet apertures, fluid communication between the elongated apertures and the next adjacent opposed outlet apertures will commence shortly after rotation begins. Upon cessation of rotation of the rotor, full fluid communication between the next opposed pair of outlet apertures is achieved and fluid communication between the previous set of outlet apertures will have been terminated.

By this means for initiating and terminating flow into next succeeding opposed outlet apertures, the flow is neither terminated nor initiated abruptly; thereby, pressure waves or "water hammer" within the conduits is obviated. Moreover, the continuing non-absolute seal at the closed outlet apertures permits equalization of pressures within the respective conduits and the pressures on opposed sides of the discs are equalized. Yet, despite such equalization of pressure very little volumetric flow through the closed outlet apertures occurs because of the small spacing between the outlet apertures and the surface of the corresponding disc. Without such equalization of pressures, the pressures attendant valving of the respective outlet apertures would be very high and the forces resulting from the pressure differentials would create substantial friction between the housing and the rotor. Hence, water distribution is possible with very low inflow rates and pressures since only the friction attendant the hub bearings and inertia of the rotor need be overcome to establish flow to the outlet apertures.

Aside from these very important operational considerations attendant the spacing between the discs and the respective outlet apertures, the criticality of dimensions is substantially reduced. Further benefits are therefore achieved in permissible manufacture of the components to lower tolerances and thereby decreasing of the costs of manufacture.

Referring to FIG. 4, there is shown the interconnection of outlet conduits extending from opposed sides of the housing interconnected with one another through a T 106 to a conduit 108. Although not shown for purposes of clarity, it is understood that the conduits attendant opposed axially aligned paired outlet apertures are similarly interconnected through a T to a conduit.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A fluid distribution apparatus for serially distributing a fluid into each of a plurality of outlet conduits from an inlet conduit, said apparatus comprising in combination:
   (a) a housing having an inlet aperture, a plurality of pairs of opposed outlet apertures and a cavity for providing fluid communication between said inlet aperture and said pairs of opposed outlet apertures;
   (b) a rotor disposed within said cavity for interconnecting said inlet aperture serially with said pairs of opposed outlet apertures, said rotor including a hollow hub having an open end in fluid communication with said inlet aperture, means for discharging water from said hub to urge rotation of said rotor, a pair of discs mounted upon said hub for constraining fluid flow into some but not all of said pairs of opposed outlet apertures, an aperture disposed in each of said discs for establishing fluid flow with at least a selected pair of said opposed outlet apertures in response to the rotational position of said rotor with respect to said housing;
   (c) means for periodically halting rotation of said rotor for serially juxtapositioning said apertures in said discs with at least a pair of said opposed outlet apertures to effect flow through at least one pair of said opposed outlet apertures; and (d) means for supporting said hub in said housing.

2. The apparatus as set forth in claim 1 wherein said housing includes means for accommodating axial displacement of said rotor.

3. The apparatus as set forth in claim 2 including means for adjustably limiting in one direction axial displacement of said rotor.

4. The apparatus as set forth in claim 3 wherein said discs are axially displaced from one another along said hub.

5. The apparatus as set forth in claim 4 wherein said discharging means is disposed intermediate said discs.

6. The apparatus as set forth in claim 5 wherein said discharging means comprises at least one jet.

7. The apparatus as set forth in claim 5 wherein said discharging means comprises a plurality of equiangularly displaced jets.

8. The apparatus as set forth in claim 1 including means for locating said discs out of physical contact with structure of said housing defining the perimeter of said outlet apertures upon inflow of fluid into said hub.

9. The apparatus as set forth in claim 8 including means for biasing said hub axially in one direction in response to the pressure of the fluid within said hub.

10. The apparatus as set forth in claim 9 including means for limiting the axial displacement of said hub in response to said biasing means.

11. The apparatus as set forth in claim 1 including means for balancing the pressure attendant opposed ones of said pairs of opposed outlet apertures.

12. The apparatus as set forth in claim 11 wherein said balancing means comprises a conduit interconnecting the opposed ones of each of said pairs of opposed outlet apertures.

13. The apparatus as set forth in claim 1 wherein said halting means comprises means for interferingly engaging said rotor.

14. The apparatus as set forth in claim 13 wherein said rotor includes a plurality of rods interconnecting said discs and wherein said halting means comprises a solenoid having a plunger for interferingly serially engaging said rods.

15. The apparatus as set forth in claim 13 including means for periodically actuating said solenoid to distribute the fluid flow to another pair of said pairs of opposed outlet apertures.

16. The apparatus as set forth in claim 1 wherein each said elongated aperture is radially aligned with adjacent pairs of said opposed outlet apertures and subtends an angle equivalent to the arcuate displacement between adjacent pairs of said opposed outlet apertures.

17. The apparatus as set forth in claim 16 wherein said elongated apertures in said discs are aligned with one another.

18. A method for distributing a fluid serially into each of a plurality of outlet conduits from an inlet conduit, said method comprising the steps of:

(a) providing a housing having a cavity disposed intermediate the inlet conduit and the outlet conduits;

(b) rotatably mounting a rotor having axially spaced apart discs located on an hollow hub within the cavity;

(c) introducing fluid from the inlet into the hub;

(d) discharging fluid from the hub into the cavity and creating a force to urge rotation of the rotor;

(e) conveying fluid through an aperture in each of the discs into the outlet apertures of an opposed pair of outlet apertures in the housing;

(f) directing the fluid from the paired outlet apertures into an outlet conduit;

(g) incrementally halting rotation of the rotor upon registration of the apertures in the discs with one of the pairs of opposed outlet apertures in the housing;

whereby, the rotor serially distributes fluid from the inlet into each of the outlet conduits in response to incremental rotation of the rotor.

19. The method as set forth in claim 18 including the step of locating the rotor axially between the opposed apertures of the pairs of opposed outlet apertures.

20. The method as set forth in claim 19 including the step of timing the incremental rotation of the rotor.

21. The method as set forth in claim 20 including the step of non-instantaneously initiating and terminating the flow into the paired opposed outlet apertures.

22. The method as set forth in claim 20 wherein said step of discharging includes the step of discharging the fluid intermediate the discs.

23. The method as set forth in claim 18 including the step of equalizing the pressure on opposed external sides of the discs.

24. The method as set forth in claim 18 including the step of continuously maintaining clearance between the surface of each disc adjacent the respective opposed outlet apertures during flow of fluid through the inlet.

25. The method as set forth in claim 18 wherein said introducing step includes the step of positioning the rotor out of direct physical contact with the part of the housing surrounding the pairs of opposed outlet apertures.

26. The method as set forth in claim 25 including the step of limiting the extent to which the rotor is repositioned during said positioning step.

27. A fluid distribution apparatus for directing a fluid into selected ones of outlet conduits in response to a flow of fluid into an inlet conduit, said apparatus comprising in combination:

(a) a pair of opposed outlet apertures for communicating with each outlet conduit;

(b) a rotor for directing fluid flow from the inlet conduit into at least a pair of said opposed outlet apertures;

(c) means for locating said rotor intermediate opposed apertures of said pairs of opposed outlet apertures;

(d) means for urging rotation of said rotor to serially direct a flow of fluid through said pairs of opposed outlet apertures;

(e) means for periodically halting rotation of said rotor to achieve fluid flow from the inlet conduit to at least one pair of said pairs of opposed outlet apertures; and (f) means for equalizing the pressure on opposed sides of said rotor adjacent each of said pairs of opposed outlet apertures.

28. The apparatus as set forth in claim 27 wherein said equalizing means includes means for maintaining said rotor out of contact with the structure defining the perimeter of said pairs of opposed outlet apertures.

29. The apparatus as set forth in claim 28 wherein said maintaining means is responsive to flow of fluid through the inlet conduit.

30. The apparatus as set forth in claim 28 wherein said maintaining means includes means for axially displacing said rotor.

31. The apparatus as set forth in claim 30 includes means for adjustably limiting the axial displacement of said rotor in one direction.

32. A method for distributing a fluid into selected ones of outlet conduits in response to a flow of fluid into an inlet conduit, said method comprising the steps of:
  (a) communicating a flow of fluid from a pair of opposed outlet apertures into each outlet conduit;
  (b) directing fluid flow from the inlet conduit into at least a pair of opposed outlet apertures with a rotor;
  (c) locating the rotor intermediate opposed apertures of the pairs of opposed outlet apertures;
  (d) urging rotation of the rotor to serially direct a flow of fluid through the pairs of opposed outlet apertures;
  (e) periodically halting rotation of the rotor to achieve fluid flow from the inlet conduit to at least one pair of the pairs of opposed outlet apertures; and
  (f) equalizing the pressures on opposed sides of the rotor adjacent each of the pairs of opposed outlet apertures.

33. The method as set forth in claim 32 including the step of maintaining the rotor out of contact with the structure defining the perimeter of the pairs of opposed outlet apertures.

34. The method as set forth in claim 32 including the step of maintaining the rotor out of contact with the structure defining the perimeter of the pairs of opposed outlet apertures during flow of fluid through the inlet aperture.

35. The method as set forth in claim 34 wherein said step of maintaining includes the step of axially displacing the rotor.

36. The method as set forth in claim 35 wherein said step of maintaining includes the step of adjustably limiting the axial displacement of the rotor in one direction.

* * * * *